United States Patent
Hayek et al.

(10) Patent No.: US 7,469,136 B2
(45) Date of Patent: Dec. 23, 2008

(54) RF RECEIVERS AND METHODS THEREFOR

(75) Inventors: Matt Hayek, Libertyville, IL (US); Deven Patel, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 1379 days.

(21) Appl. No.: 09/998,489

(22) Filed: Nov. 30, 2001

(65) Prior Publication Data

US 2003/0104799 A1 Jun. 5, 2003

(51) Int. Cl.
*H04B 1/26* (2006.01)
(52) U.S. Cl. .................. 455/324; 455/323; 455/318; 455/313; 455/334
(58) Field of Classification Search .......... 485/324, 485/317, 323, 318, 319, 316, 313, 314, 315, 485/334, 338, 339, 340, 255, 256, 257, 258, 485/259, 260, 264, 265; 329/306, 307, 346, 329/318, 319, 320, 323, 324, 325
See application file for complete search history.

(56) References Cited

U.S. PATENT DOCUMENTS

| | | | | |
|---|---|---|---|---|
| 5,170,495 | A * | 12/1992 | McNicol et al. | 455/116 |
| 5,530,929 | A * | 6/1996 | Lindqvist et al. | 455/324 |
| 6,073,000 | A * | 6/2000 | Shinohara | 455/317 |
| 6,192,225 | B1 | 2/2001 | Arpaia et al. | |
| 6,243,569 | B1 * | 6/2001 | Atkinson | 455/324 |
| 6,282,413 | B1 * | 8/2001 | Baltus | 455/323 |
| 6,360,087 | B1 * | 3/2002 | Rozenblit et al. | 455/255 |
| 6,487,419 | B1 * | 11/2002 | Freed | 455/522 |
| 6,721,369 | B1 * | 4/2004 | Hash et al. | 375/296 |
| 6,731,923 | B2 * | 5/2004 | Atkinson | 455/323 |
| 6,785,518 | B2 * | 8/2004 | Atkinson et al. | 455/86 |
| 6,845,233 | B2 * | 1/2005 | Louis et al. | 455/313 |
| 7,149,493 | B2 * | 12/2006 | Molnar et al. | 455/326 |
| 2001/0039182 | A1 * | 11/2001 | Atkinson | 455/20 |

FOREIGN PATENT DOCUMENTS

JP 2000068748 A 3/2000

OTHER PUBLICATIONS

Mouly et al., "The GSM System for Mobile Communications", Cell & Sys., 1992, pp. 217 and 218.*

* cited by examiner

*Primary Examiner*—Charles N Appiah
*Assistant Examiner*—Willie J Daniel, Jr.
(74) *Attorney, Agent, or Firm*—Roland K. Bowler, II

(57) ABSTRACT

Methods in intermediate frequency and direct conversion receivers for reducing pre-selection filter leakage and harmonic coupling to a programmable voltage controlled oscillator by mixing a receive signal at a mixer having a mixer injection frequency outside a pre-selection filter passband. In some applications, the mixer injection frequency is conditionally moved outside the pre-selection filter passband. In other applications, signal gain is increased to compensate for any loss resulting from shifting the mixer injection frequency outside the pre-selection passband.

13 Claims, 4 Drawing Sheets

RF RECEIVERS AND METHODS THEREFOR

FIELD OF THE INVENTIONS

The present inventions relate generally to RF receivers, and more particularly very low intermediate frequency and direct conversion receivers having improved performance and methods therefor.

BACKGROUND OF THE INVENTIONS

In known very low intermediate frequency (VLIF) receivers and direct conversion receivers (DCRs), the mixer injection frequency is relatively near or at the desired signal frequency. In VLIF receivers for example the mixer injection frequency is equal to the receive signal frequency plus or minus the intermediate frequency. In direct conversion receivers, the injection frequency is equal to the signal frequency.

The proximity of the mixer injection frequency and the receive signal frequency in VLIF and direct conversion receivers results in the mixer injection frequency being within the passband of the pre-selection filter, usually before the low noise amplifier (LNA) portion of the receiver. Prior art FIG. 1 illustrates a frequency spectrum of a conventional VLIF receiver system with chopping and mixing products, where the mixer injection frequency and the receive signal frequency are within the passband of the pre-selection filter. After mixing, the conventional chopper output product, which may be an intermediate or baseband signal, is within the VLIF Passband or direct conversion receiver passband.

In prior art FIG. 1, in conventional VLIF and direct conversion receivers, the pre-selection filter does not prevent leakage of the mixer injection frequency back through the antenna, since the mixer injection frequency is within the receive passband 110. Mixer injection frequency leakage is undesirable because it causes interference. Communication specification standards thus impose limits on this leakage.

The proximity of the mixer injection and receive signal frequencies in VLIF and direct conversion receivers also tends to aggravate the coupling of harmonics to the voltage controlled oscillator (VCO), thus degrading receiver performance. Harmonic or fundamental frequency coupling to the VCO is especially troublesome at higher signal strengths and in applications where the VCO is integrated on the same integrated circuit (IC) as the receiver.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The inventions are applicable generally to RF receivers that chop and mix input signals in the receive passband, and particularly to intermediate frequency, for example VLIF, and direct conversion (DC) receivers, including those used in wireless mobile communications devices, for example cellular telephone handsets, among many other applications.

Figure 2:
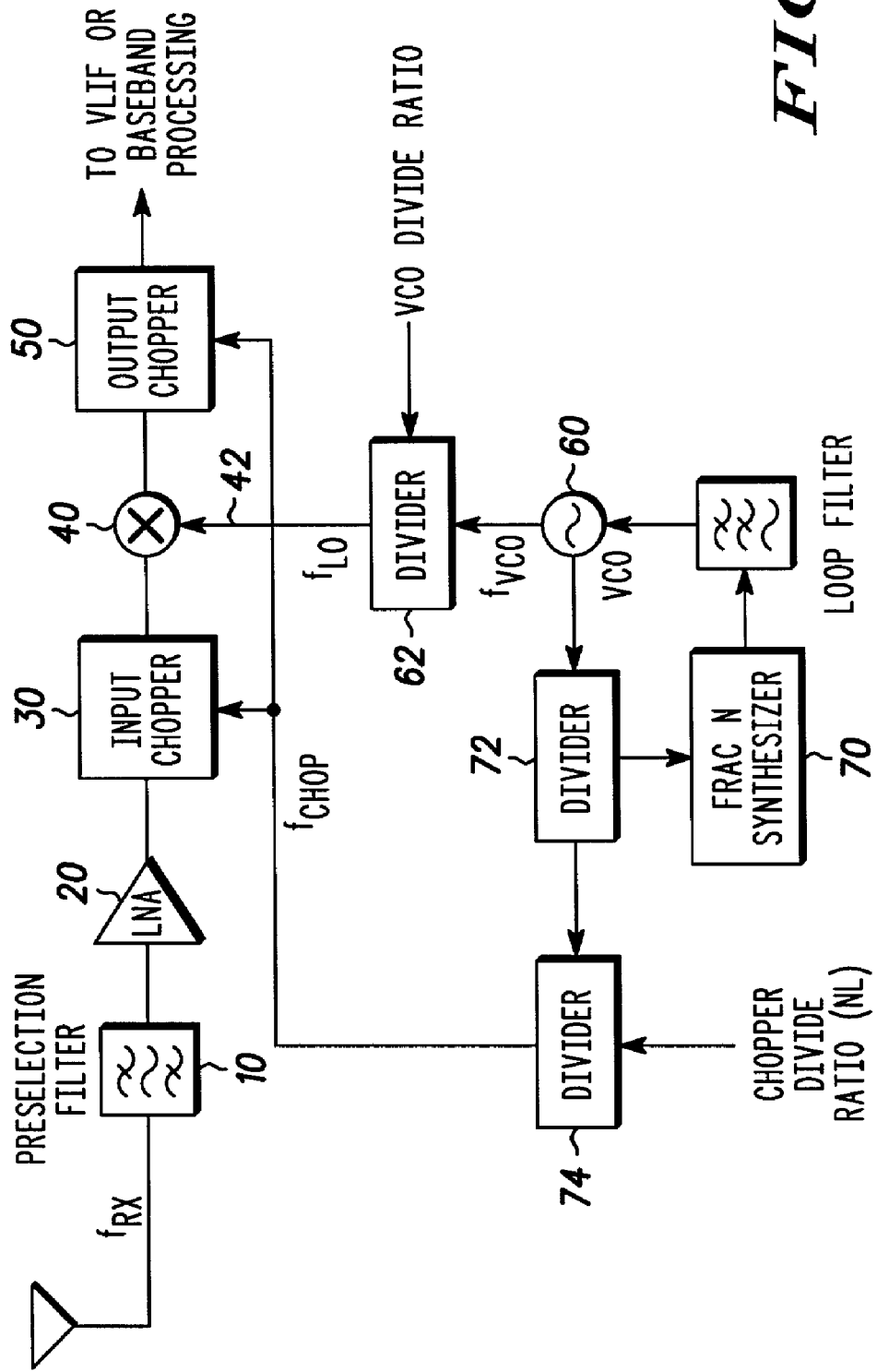
FIG. 2 is schematic block diagram of an exemplary RF receiver.

FIG. 2 is an exemplary receiver or portion thereof, for example a VLIF or direct conversion receiver, comprising generally an optional pre-selection filter 10 coupled to a low noise amplifier (LNA) 20, coupled to an input chopper 30 having an output coupled to an input of a mixer 40 having an output coupled to an input of an output chopper 50. The output chopper 50 is coupled generally to VLIF or baseband processing circuitry, depending on the receiver type.

The input chopper 30 mixes the desired receive signal band up and down, and the output chopper 50 mixes the signal band back down and up after the mixer 40. The mixer includes an input 42 for a mixer injection frequency signal ($f_{LO}$) generated by a voltage-controlled oscillator (VCO) 60. In the exemplary embodiment, there is a frequency divider 62 between the VCO 60 and the mixer 40 for dividing the VCO output, according to a VCO Divide Ratio control signal, down to the desired mixer injection frequency ($f_{LO}$). In some embodiments, the frequency divider 62 has a unity divide ratio, or the frequency divider 62 is nonexistent. The VCO 60 and frequency divider 62 may both be controlled by a processor, which is not illustrated in the drawing.

FIG. 2 also illustrates a programmable fractional-N synthesizer 70 having a feedback signal input for receiving a feedback signal from the VCO 60. The exemplary embodiment also includes a frequency divider 72 for dividing the feedback signal from the VCO to the fractional-N synthesizer, but the frequency divider 72 is not required for all applications. In embodiments where the divider 72 is programmable, it may also include a divide ratio control input from the processor.

An output of the VCO is also provided to the input chopper 30 and the output chopper 50 in the form of a chopper frequency signal ($f_{CHOP}$). In the exemplary embodiment, there is a programmable frequency divider 74 between the VCO 60 and the input and output choppers 30 and 50 for dividing the VCO output according to a Chopper Divide Ratio (NL), which may be controlled programmably by a processor.

Figure 1:
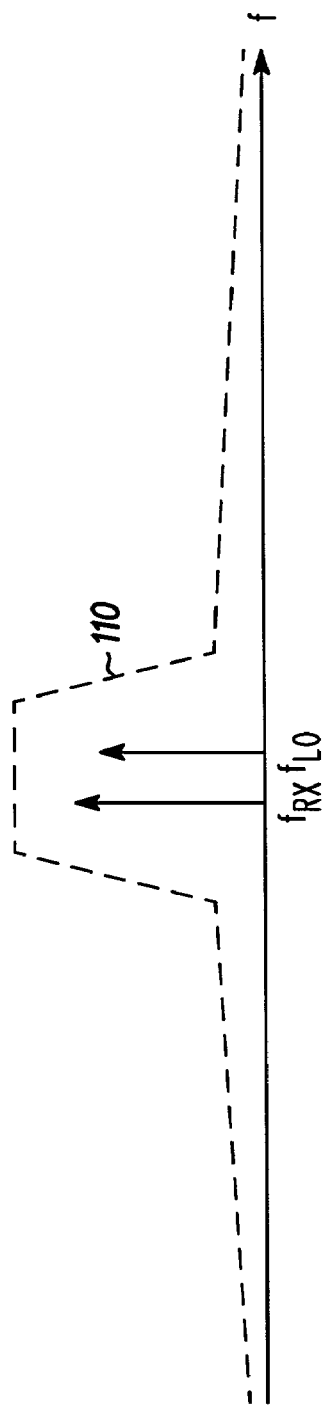
FIG. 1 is a prior art frequency spectrum portion for a conventional VLIF receiver where the mixer injection frequency is within the receive signal passband.
Figure 3:
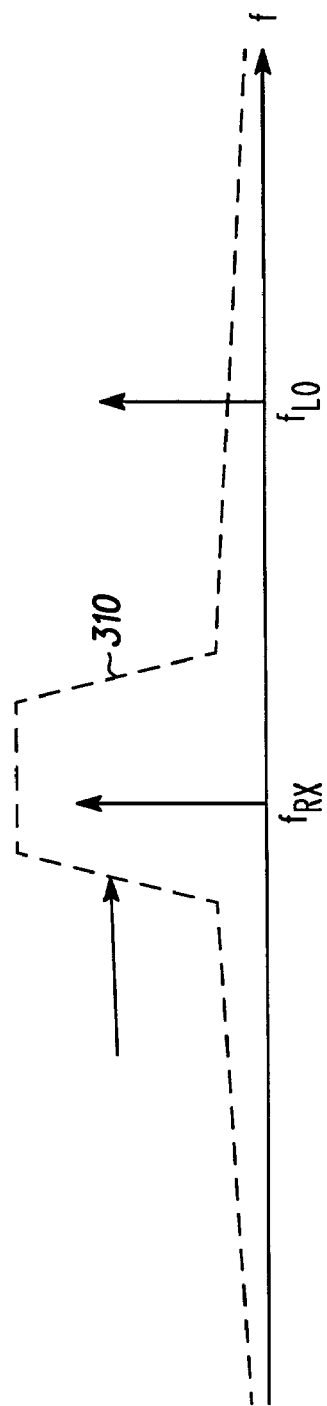
FIG. 3 is a frequency spectrum for an RF receiver of the present invention where the mixer injection frequency is outside the receive signal passband.

In embodiments where there is a pre-selection filter and improved mixer injection frequency leakage control is desired, the receive signal frequency ($f_{RX}$) of the receiver within the pre-selection filter passband is mixed at a mixer injection frequency ($f_{LO}$) outside the pre-selection filter passband ($BW_{PSF}$) of the receive signal frequency ($f_{RX}$). FIG. 3 illustrates the mixer injection frequency ($f_{LO}$) located outside the passband 310 of the pre-selection filter, thereby reducing the leakage of the mixer injection signal back through the pre-selection filter.

In one embodiment of the invention, the mixer injection frequency ($f_{LO}$) is determined according to the following expression:

$$f_{LO} = [(f_{RX} - f_{IF})/(1 - K_{LO}/NL)] \qquad \text{Eq. (1)}$$

The first quantity, ($f_{RX} - f_{IF}$), of Equation (1) is proportional to a difference between the desired signal frequency ($f_{RX}$) and an intermediate frequency ($f_{IF}$). The first quantity, ($f_{RX} - f_{IF}$), may be expressed more generally as $(f_{RX}-\text{side}*f_{IF})$, where variable "side" is either +1 or −1 representative of low side injection and high side injection, respectively. The relationship may also be expressed as $(f_{RX}+/-f_{IF})$.

The second quantity, $(1-K_{LO}/NL)$, of Equation (1) is proportional to a difference between unity and a quantity proportional to a reciprocal of the chopper divide ratio, NL, where $K_{LO}$ is a proportionality constant dependent generally on the VCO Divide Ratio. The second quantity, $(1-K_{LO}/NL)$, may be express more generally as $(1-m*K_{LO}/NL)$, where variable "m" is either +1 or −1, corresponding to the chopper mode. The relationship may also be expressed as $(1+/-K_{LO}/NL)$. The m=−1 mode corresponds to a chopper output product of $(f_{RX}-f_{LO}-2f_{CHOP})$, and the m=+1 mode corresponds to a chopper output product of $(f_{RX}-f_{LO}+2f_{CHOP})$.

Determination of a mixer injection frequency, $(f_{LO})$, may be expressed more generally as follows:

$$f_{LO}=[(f_{RX}-\text{side}*f_{IF})/(1-m*K_{LO}/NL)] \quad \text{Eq. (2)}$$

Equation (2) has four possible solutions for the mixer injection frequency $(f_{LO})$.

The mixer injection frequency $(f_{LO})$ will be outside the pre-selection filter passband ($BW_{PSF}$) identified at 310 in FIG. 3 upon satisfaction of Equation (3) below:

$$ABS[f_{LO}-f_{RX}]>kBW_{PSF} \quad \text{Eq. (3)}$$

where ABS is the absolute value of the difference between the mixer injection frequency $(f_{LO})$ and the receive signal, $(f_{RX})$, and where k is a subjective factor, preferably >=1. For k=1, the mixer injection frequency $(f_{LO})$ would be at the 3 dB band edge of the preselection filter. For k>1, the mixer injection frequency $(f_{LO})$ is attenuated further as a function of the preselection filter attenuation. The actual k setting depends upon how much attenuation is desired to meet the specification.

Substitution of Equation 2 for $(f_{LO})$ in Equation (3) and rearranging terms results in the following expressions for m=1 and m=−1 respectively.

$$(m=1)K_{LO}<NL<K_{LO}/[1-(f_{RX}-\text{side}*f_{IF})/(f_{RX}+kBW_{PSF})] \quad \text{Eq. (4a)}$$

$$(m=-1)K_{LO}<NL<K_{LO}/[-1+(f_{RX}-\text{side}*f_{IF})/(f_{RX}-kBW_{PSF})] \quad \text{Eq. (4b)}$$

With the assumption $f_{IF}<<f_{RX}$, Equations (4a, 4b) may be approximated as:

$$(m=1)K_{LO}<NL<[K_{LO}(f_{RX}+kBW_{PSF})]/[kBW_{PSF}] \quad \text{Eq. (5a)}$$

$$(m=-1)K_{LO}<NL<[K_{LO}(f_{RX}-kBW_{PSF})]/[kBW_{PSF}] \quad \text{Eq. (5b)}$$

Since the upper limit in Eq. (5b) is a more stringent requirement this equation could be used to choose NL regardless of which mode, m, is selected to insure $f_{LO}$ is kept out of the preselection passband.

The lower limit of $K_{LO}$ on NL is a consequence of maintaining $f_{CHOP}$ less than for $f_{LO}$. More particularly, in some embodiments, NL should be kept as close to the upper limit to keep $f_{CHOP}$ as low as possible to realize practical implementation of chopper circuitry at lower frequencies. The selection of the particular solution may be limited by the capacity of the hardware, and particularly the operating limits of the VCO.

In some receivers, shifting the mixer injection frequency outside the pre-selection filter passband reduces signal gain. In some embodiments, the loss in gain is as much as approximately 6 dB. In these applications it may be desirable to shift the mixer injection frequency only when the signal strength is sufficiently high that the marginal loss in gain does not adversely affect receiver performance. In other embodiments, signal gain may be increased before mixing, for example at the LNA, to compensate for any loss.

Shifting the mixer injection frequency outside the passband of the desired signal frequency is desirable in applications, among others, where the signal level is relatively high and/or where the receiver and VCO are integrated on a common integrated circuit, since harmonic coupling to the VCO tends to be more problematic at higher signal strengths and in applications where the receiver and VCO are fabricated on the same integrated circuit.

Figure 4:
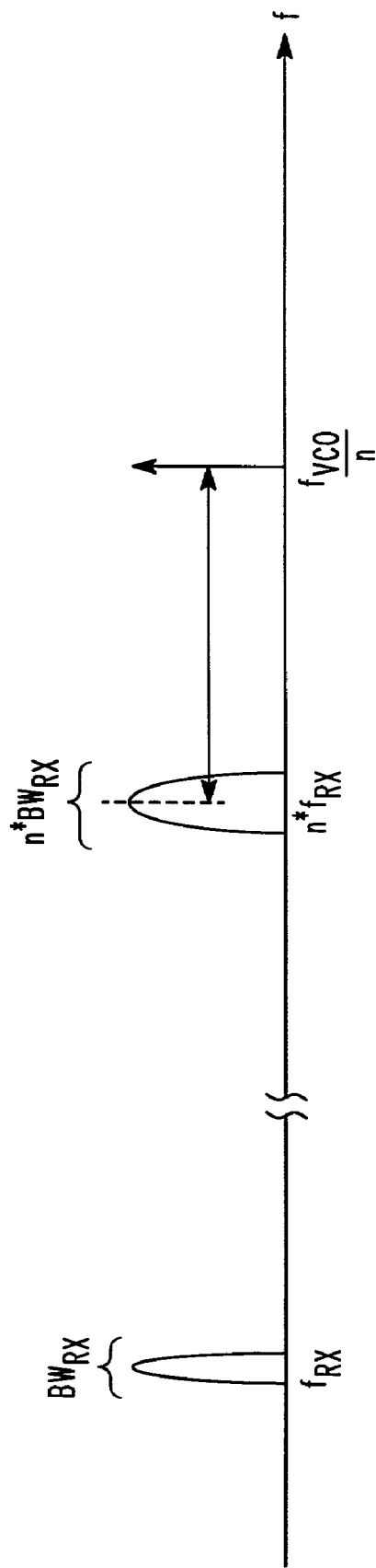
FIG. 4 illustrates the frequency of the voltage-controlled oscillator (VCO) outside the bandwidth of the harmonic or fundamental of the receive signal corresponding to the frequency divide ratio of the VCO.

The coupling of the receive signal and harmonics thereof to the VCO in intermediate frequency and direct conversion receivers may be reduced by mixing the receive signal at a mixer injection frequency, $f_{LO}$, obtained from a VCO frequency that is outside the bandwidth of the receive signal or harmonics thereof, as illustrated in FIG. 4.

To illustrate the above point consider under the prior art case that $f_{LO}$ is $f_{IF}$ away from $f_{RX}$. Further assume $f_{IF}<BW_{RX}$ (which is generally the case in VLIF and Direct Conversion Receivers), where $BW_{RX}$ is the channel bandwidth of the signal $f_{RX}$. The VCO frequency would be $q*f_{LO}$, where q is the divide ratio of the VCO divider 62 in the exemplary receiver of FIG. 2. If q is an integer, the VCO frequency will be corrupted by the $n^{th}$ harmonic of $f_{RX}$. In the case where q=1 the VCO is corrupted by the fundamental frequency $f_{RX}$ directly.

To avoid the above situation where q is an integer, $f_{LO}$ is moved, using Eq. (2), so that the $f_{VCO}$ is out of the signal harmonics' bandwidth (Illustrated in FIG. 4). The VCO frequency, and indirectly the mixer injection frequency $(f_{LO}=f_{VCO}/q)$, are outside the bandwidth $(nBW_{RX})$ of the nth harmonic of the receive signal $(nf_{RX})$ when the following condition is satisfied:

$$ABS[qf_{LO}-nf_{RX}]>k[(nBW_{RX}/2)+(BW_{VCO})] \quad \text{Eq. 6}$$

where ABS is the absolute value of the quantity in brackets, q is the VCO divide ratio, n is the harmonic of interest, $(f_{LO})$ is the mixer injection frequency, $(f_{RX})$ is the receive signal frequency, $(BW_{RX})$ is the bandwidth of the receive signal, $BW_{VCO}$ is the loop bandwidth of the VCO, and k>=1 as discussed above. Generally, setting k=1 will substantially remove most signal components and harmonic from the VCO bandwidth. Increasing k>1 will provide even greater isolation.

Figure 5:
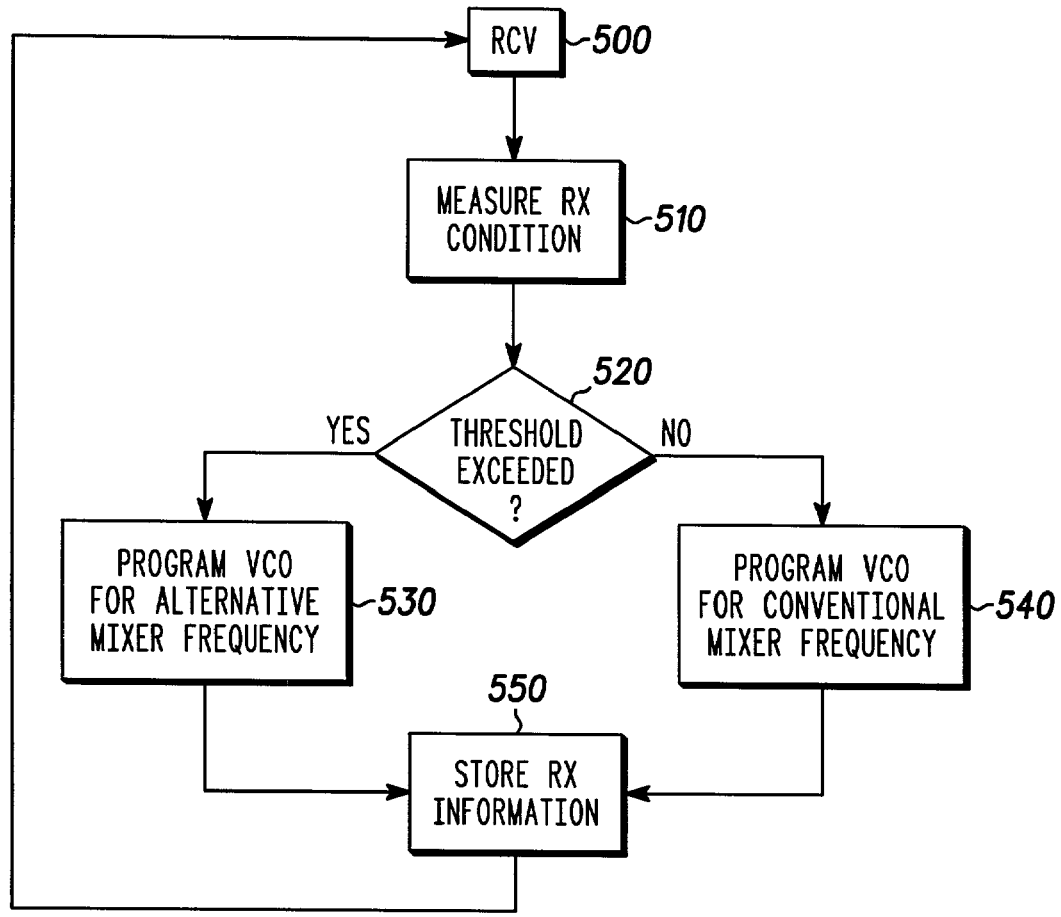
FIG. 5 is process flow diagram according to an exemplary embodiment of the invention.

FIG. 5 is an exemplary flow diagram illustrating operation of a receiver according to an exemplary application. The signal is received at block 500 and a condition thereof, for example signal strength, is determined at block 510. At block 520, the condition is evaluated, for example if the signal strength is above a predetermined threshold known to cause undesirable harmonic coupling with the VCO, then the VCO is programmed to provide an alternative mixer injection frequency $(f_{LO})$ according to the present invention at block 530. The alternative mixer frequency may be determined in advance and stored in a look-up table or otherwise stored in memory. If at block 520, the condition threshold is not exceeded, then in the exemplary embodiment of FIG. 5, the VCO is programmed to provide a conventional mixer injection frequency, for example $(f_{LO}=f_{RX}-f_{IF})$ at block 540. The measured condition of the received signal may be stored at block 550.

In another embodiment, in FIG. 5, the condition measured at block 510 is a bit error rate (BER) of the receive signal. According to this embodiment, the mixer injection frequency is shifted outside the receive passband if the BER is above some threshold, for example above 2%. In another embodiment, it may be desirable to shift the mixer injection frequency outside the receive signal passband only if both the BER and signal levels are above corresponding thresholds.

In other applications, the mixer injection frequency is determined according to Equation (2) at all times. In these applications, the signal gain may be increased before mixing to counter any loss in gain resulting from shifting the mixer injection frequency outside the receive signal passband. In some embodiments, for example, the gain is increased only if it is below some threshold that would adversely affect receiver performance upon any loss in gain resulting from programming the VCO to generate the mixer injection frequency according to Equation (2).

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

The invention claimed is:

1. A method in intermediate frequency and direct conversion receivers having a pre-selection filter passband, comprising:
    mixing a receive signal at a mixer injection frequency outside the pre-selection filter passband,
    the mixer injection frequency proportional to a first quantity divided by a second quantity,
    the first quantity proportional to a difference between the receive signal frequency and an intermediate frequency,
    the second quantity proportional to a difference between unity and a quantity proportional to a reciprocal of a chopper divide ratio.

2. The method of claim 1, chopping the receive signal at an input chopper before mixing, chopping the receive signal at an output chopper after mixing, the input and output choppers having a chopper frequency proportional to the mixer injection frequency divided by the chopper divide ratio.

3. The method of claim 1, increasing a gain of the receive signal before mixing.

4. The method of claim 1,
    measuring a condition of the receive signal,
    mixing the receive signal at a mixer injection frequency proportional to a difference between the desired signal frequency and an intermediate frequency if the receive signal condition is below a predetermined threshold;
    mixing the receive signal at a mixer injection frequency proportional to the first quantity divided by the second quantity if the receive signal condition is above the predetermined threshold.

5. A method in intermediate frequency and direct conversion receivers having a pre-selection filter passband ($BW_{PSF}$), comprising:
    mixing a receive signal at a mixer having a mixer injection frequency ($f_{LO}$) proportional to $(f_{RX}-/+f_{IF})/(1-/+K_{LO}/NL)$,
    chopping the receive signal with a chopper having a chopper frequency ($f_{CHOP}$) proportional to ($f_{LO}/NL$),
    where ($f_{RX}$) is a frequency of the receive signal, ($f_{IF}$) is an intermediate frequency of the receiver, NL is a divide ratio of the chopper, ($K_{LO}$) is a VCO proportionality constant divide ratio.

6. The method of claim 5, selecting the mixer injection frequency ($f_{LO}$) so that an absolute value of ($f_{RX}-f_{LO}$) is greater than the preselection filter passband ($BW_{PSF}$).

7. The method of claim 5, selecting the mixer injection frequency ($f_{LO}$) so that a VCO frequency, $f_{VCO}$, is outside a bandwidth of receive signal harmonics.

8. The method of claim 5,
    measuring a strength of the receive signal,
    mixing the receive signal at the mixer having the mixer injection frequency ($f_{LO}$) proportional to $(f_{RX}-/+f_{IF})/(1+/-K_{LO}/NL)$ when the receive signal strength is above a predetermined threshold;
    mixing the receive signal at a mixer having a mixer injection frequency ($f_{LO}$) proportional to ($f_{RX}-/+f_{IF}$) when the receive signal strength is below the predetermined threshold.

9. The method of claim 8, chopping the receive signal at an input chopper before mixing, chopping the receive signal at an output chopper after mixing, the input and output choppers having a chopper frequency ($f_{CHOP}$) proportional to the mixer injection frequency divided by the chopper divide ratio ($f_{LO}/NL$).

10. The method of claim 8, increasing a gain of the receive signal before mixing if the receive signal gain is below a threshold.

11. A method in intermediate frequency and direct conversion receivers, comprising:
    receiving a signal;
    providing a mixer injection frequency by dividing a voltage controlled oscillator output by a frequency divide ratio, the voltage controlled oscillator having a frequency outside a bandwidth of received signal harmonics;
    mixing the received signal at a mixer injection frequency outside a bandwidth of a fundamental frequency of the received signal.

12. The method of claim 11, dividing the voltage controlled oscillator output by a frequency divide ratio equal to one.

13. The method of claim 11, mixing the received signal at a mixer injection frequency outside a channel bandwidth of the received signal.

* * * * *